US008317445B2

(12) United States Patent
Reeder

(10) Patent No.: US 8,317,445 B2
(45) Date of Patent: Nov. 27, 2012

(54) BUTTERFLY PUSH-PULL PIN

(76) Inventor: Fredrick Arlen Reeder, Winchester, MA (US)

( * ) Notice: Subject to any disclaimer, the term of this patent is extended or adjusted under 35 U.S.C. 154(b) by 232 days.

(21) Appl. No.: 12/769,085

(22) Filed: Apr. 28, 2010

(65) Prior Publication Data

US 2011/0268535 A1 Nov. 3, 2011

(51) Int. Cl.
*F16B 15/02* (2006.01)

(52) U.S. Cl. ........................................ 411/439; 411/923

(58) Field of Classification Search .................. 411/439, 411/923

See application file for complete search history.

(56) References Cited

U.S. PATENT DOCUMENTS

| | | | | | |
|---|---|---|---|---|---|
| 654,319 | A | | 7/1900 | Moore | |
| 816,095 | A | * | 3/1906 | House | 411/473 |
| 1,207,960 | A | * | 12/1916 | McNeill | 472/51 |
| 1,991,561 | A | | 2/1935 | Krantz | |
| 2,266,432 | A | * | 12/1941 | Morin et al. | 264/161 |
| D149,099 | S | | 3/1948 | Sweet | |
| 3,205,757 | A | * | 9/1965 | Kuennen | 411/498 |
| D409,663 | S | * | 5/1999 | Wagner et al. | D19/65 |
| D410,032 | S | * | 5/1999 | Wagner et al. | D19/65 |
| D414,207 | S | * | 9/1999 | Wagner et al. | D19/65 |
| 6,132,060 | A | | 10/2000 | Gallo | |
| 6,196,782 | B1 | * | 3/2001 | Wagner et al. | 411/485 |
| 6,406,241 | B1 | | 6/2002 | Lorincz | |
| 6,409,445 | B1 | | 6/2002 | Beale et al. | |
| D503,432 | S | | 3/2005 | Huang | |
| D572,122 | S | * | 7/2008 | Cave | D8/373 |

* cited by examiner

*Primary Examiner* — Flemming Saether

(57) ABSTRACT

The Butterfly Push-Pull Pin, also referred to as a force advantageous push-pull pin in this application is a practical fastener used to support penetrable materials on supporting material such as a bulletin board, notice board, tack board, wall or other element penetrable by a push pin. In the Butterfly Push-Pull Pin, two broad, sloped, opposing sides of a polygonal handle are grasped to push the pin in. Two other broad, sloped, opposing sides of the polygonal handle are used to pull the pin out.

2 Claims, 2 Drawing Sheets

BUTTERFLY PUSH-PULL PIN

FIELD OF THE INVENTION

The present invention relates to a push pin, which is an apparatus for securing an item to supporting material.

BACKGROUND OF THE INVENTION

Push pins, as the expression is used here, are pins which are pushed through a material or materials requiring support, then into a supporting material. Push pins were first patented in the late 19$^{th}$ Century. This type of push pin is comprised, commonly, of two components: a handle and a pin, which are intended to remain together as a unit. The push pins are typically used to support materials in temporary or changeable circumstances and they are pushed in (driven) by human force and pulled out (removed) by human force. The devices that are known by, and described by, the expression "push pin," typically are operated in the push and pull modes. They might be more properly identified as push-pull pins, but the expression push-pin is commonly used in descriptions of prior art and in common practice by people who use such devices. A typical use of push pins would be to support drawings on a vertical or sloped bulletin board or tack board, for example.

As can be seen in the prior art referenced in this application, the handles on available push pins offer small areas of purchase to grasp between thumb and finger, or between two fingers, in order to drive the push pin into supporting material. With prior art, when driving a push pin into supporting material, the procedure often is difficult because the thumb and finger contact surfaces of the pin handles lack sufficient surface area, the shape of the handle is difficult to grasp securely, or the shape of the handle does not naturally direct efficient force toward the supporting material. A person intending to drive in a push pin, with stability, often has to pinch, or squeeze, the handle so firmly, parallel to the surface of the supporting material rather than perpendicular (the drive in direction), that limited energy is available to push the pin into the supporting material. Due to limited contact area in many prior art devices, thumb and finger, or fingers, often slide off the push pin handle before the pin is properly embedded in the supporting material. Due to prior art shape—geometry—there is often limited pushing surface for driving the push pin efficiently into supporting material. Due to prior art geometry, in order to grasp and drive in the push pin, many people must use more than two digits.

In prior art, even less attention has been paid to the process of pulling the pin out of the supporting material, axially opposite the pushing direction. The contact area is so small and the handle shape is so difficult to grasp that, again, an inefficient pinching energy is required and often the thumb and finger slide off the pin handle before the pin has been removed from the supporting material.

The inventor in this patent application has used common, prior art push pins for several years and it is because of his annoyance and frustration in using this prior art that he created the present invention.

SUMMARY OF THE INVENTION

The present invention, the Butterfly Push-Pull Pin, is a very practical fastener used to support penetrable (pierceable) materials on a bulletin board, notice board, tack board, wall or other element penetrable by a push (driven) pin. In the butterfly push-pull pin, two broad, sloped, opposing sides of the polygonal handle are grasped by a user's thumb and opposing finger, or two fingers, to push the pin in, and the user's thumb and opposing finger, or two fingers, are used to pull the pin out, using the other two broad, sloped, opposing sides of the polygon. The broad sides give advantageous purchase to the acts of pushing and pulling and the sloped geometry of the sides assists in alignings energy in the proper axial direction to either push or pull the push-pull pin. Therefore, the push-pull pin is force advantageous because it provides, in its geometry, an advantageous means of forcing the pin into supporting material and an advantageous means of pulling the pin out of the supporting material. The opposing push and pull faces of the polygonal handle enable a user to push or pull the pin more easily than prior art, using one finger and a thumb, or two fingers.

OBJECTS AND ADVANTAGES

Several objects and advantages of the present invention are:

(a) To provide a force advantageous, stable, easy means to push (drive), the device through material to be supported and into supporting material.

(b) To provide a force advantageous, stable, easy means to pull (extract) the pin from supporting material.

(c) To provide improved safety over prior art.

BRIEF DESCRIPTION OF THE INVENTION DRAWINGS

FIG. 1 is a plan (top) view of the invention,

FIG. 2 is a perspective view of the invention,

FIG. 3 is a front elevation and rear elevation of the invention, in which the raised ribs of the push sides are visible, FIG. 4 is a left side elevation and right side elevation of the invention, in which the pull sides are visible, FIG. 5 is a perspective view thereof, as pulled (extracted), and FIG. 6 is a perspective view thereof, as pushed (driven).

REFERENCED NUMERALS IN THE DRAWINGS

1. Polygonal push-pull handle

Figure 1:
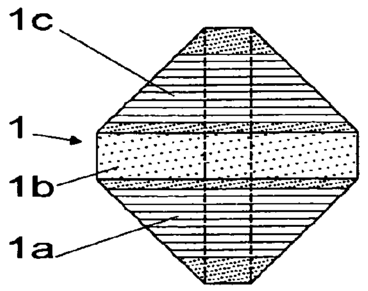
FIGS. 1, 2, 3, 4, 5 and 6 illustrate the butterfly push-pull pin.

2. Pin with one deformed embedded end and with one taper exposed end terminating in a point.

DETAILED DESCRIPTION OF THE EMBODIMENT

A preferred embodiment of the present invention is illustrated in FIGS. 1, 2, 3, 4, 5 and 6. The butterfly push-pull pin is one unit comprised of two components, which are permanently affixed to one another: a six-surfaced polygonal handle and a deformed, embedded pin.

The purpose of the present invention, the Butterfly Push-Pull Pin, is to support penetrable (pierceable) materials on supporting material such as a bulletin board, notice board, tack board, wall or other element penetrable by a push (driven) pin.

Referring to the drawings, in particular FIGS. 1, 2, 3 and 4, there is shown an embodiment of the push pin consisting of two portions: a handle 1 and a pin 2. The polygonal handle portion includes four major surfaces 1*a*, 1*c*, 1*d*, 1*f*, and two minor surfaces 1*b* and 1*e*. Surface 1*b* is the top minor surface and surface 1*e* is the bottom minor surface.

Figure 5:
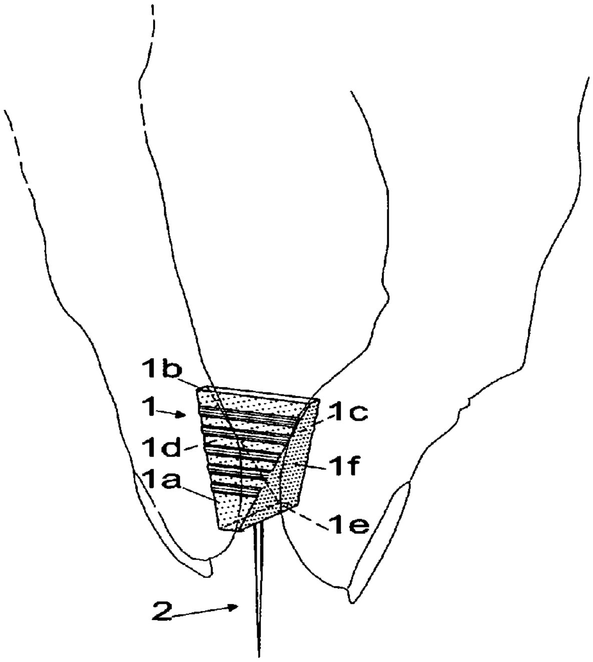
Figure 6:
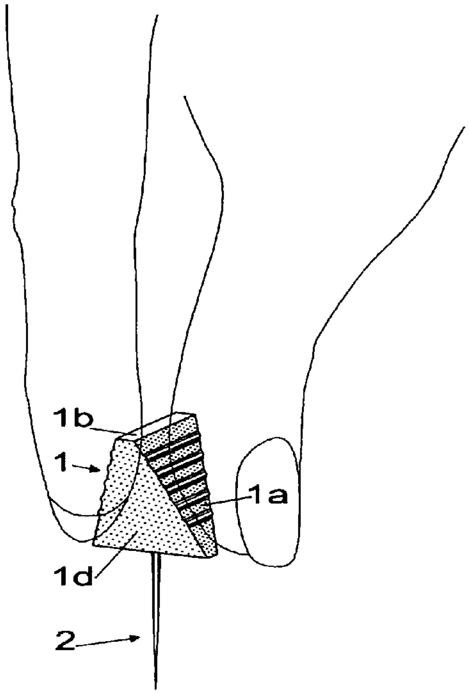

Referring to FIGS. 5 and 6, In the Butterfly Push-Pull Pin, two broad, sloped, opposing sides of the polygonal handle, surfaces 1*a* and 1*c*, are grasped by a user's thumb and opposing finger, or two fingers, to push the pin in, as indicated in FIG. 6. The user's thumb and opposing finger, or two fingers, are used to pull the pin out, using the other two broad, sloped, opposing sides of the polygon, surfaces 1*d* and 1*f*, as indicated in FIG. 5. The two major handle surfaces 1*a* and 1*c*, diametrically opposed, are advantageously inclined to facilitate collection of grasping forces, parallel to the surface of supporting material, and pushing force, perpendicular to the surface of supporting material. The other two major handle surfaces, 1*d* and 1*f*, diametrically opposed, are advantageously inclined to facilitate collection of grasping forces, parallel to the surface of supporting material, and pull force, perpendicular to the surface of supporting material. Grasp-push handle surfaces are distinctly and dissimilarly inclined from grasp-pull handle surfaces, in recognition of the need for opposite force direction bearing surfaces.

The present invention exhibits novelty in that, although push pins with the same intended purpose were first patented more than 100 years ago and several types of push pins have been patented since, none of the prior art provides the geometry and consequential force advantage of the present invention and none of the prior art indicates a deformed pin embedment intended to prevent unintentional extraction. Therefore, the present invention was not obvious to anyone of ordinary skill in the art of making push pins.

Figure 2:
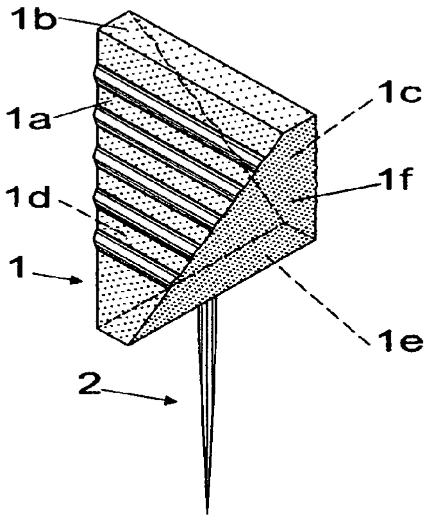

The polygonal handle has a long and narrow bottom face and a face of the same size at the top, turned 90 degrees to the like face at the bottom, as indicated in FIGS. 1 and 2. Connecting these two faces are four equal size trapezoidal faces, as indicated in FIGS. 1, 2, 3, 4, 5, and 6. The two long and narrow faces and the four trapezoidal faces form a closed, six-sided polygon which is comprised of solid material and is not hollow. The outermost three-dimensional limits of the handle fit precisely within the limits of a cubic (equal-sided) volume. In the preferred embodiment, this volume is approximately ¾" by ¾" by ¾", and it could be larger and it could be smaller. The polygonal handle in the present invention can be fabricated from readily available materials and it can be manufactured by anyone skilled in the art of making push pins.

The polygonal handle may be made of various materials, such as metals, plastics and wood. The handle material may be formed and pressed around the deformed pin or it may be cast around the deformed pin, in a manner which mechanically engages the deformed pin, in order to prevent separation of the handle and the pin.

(c) The raised ribs, as indicated in FIGS. 1, 2, 3, 4, 5 and 6, of the push faces of the handle assist in grasping and removing the pin from storage (when not already stored in driven position) and in retaining the push-pull pin between two digits prior to driving it through material to be supported and into supporting material. It is preferred that each push face of the polygonal handle have at least one raised rib. It is within the skill of those in the art to vary the number of the ribs. It is well within the skill of those in the art to vary the rib configuration on each of the push faces, such that the ribs may extend less than the full width of the push faces, or they may be situated diagonally or they may be present in a grid or diagrid formation on the push faces. It is well within the skill of those in the art to add ribs, as described for the push faces, on the pull faces. It is well within the skill of those in the art to construct the push and pull faces of the polygonal handle with grooves rather than raised ribs, grooves being the obverse of raised ribs.

Figure 3:
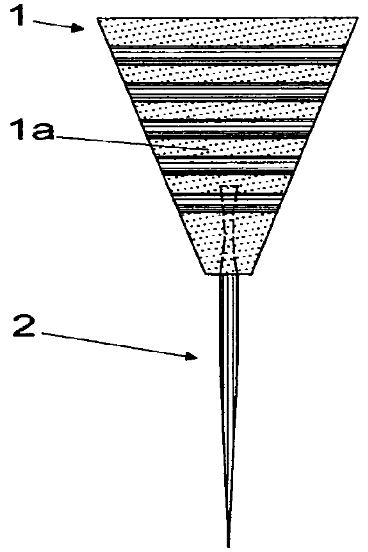
Figure 4:
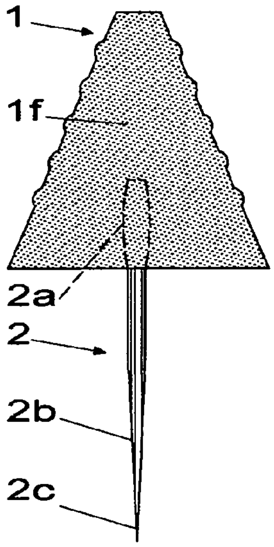

Referring to FIG. 4, pin 2 is made of metal. Pin end 2*a* is deformed and is embedded in the polygonal handle, as indicated in FIGS. 3 and 4.

Pin end 2*c* opposite the embedded end is tapered and terminates in a point, so that it may be driven into supporting material.

ADVANTAGES

On its own and compared with prior art, the present invention, the Butterfly Push-Pull Pin, offers the following advantages based on the description above:

(a) The polygonal handle geometry provides a force advantageous, stable, easy means to push (drive), the device through material to be supported and into supporting material.

(b) The polygonal handle geometry provides a force advantageous, stable, easy means to pull (extract) the pin from supporting material.

(c) The polygonal handle geometry provides improved safety over prior art.

(d) The deformed, embedded end of the pin prevents the unintended separation of the push pin handle and the pin.

Alternative Physical Forms of the Present Invention

The above description of the present invention should not be construed to limit physical manifestations of the Butterfly Push-Pull Pin to the exact characterization shown in the drawings. Alterations within the claims may include, but not be limited to:

(a) Beveled or radiused edges instead of anises formed by the intersections of polygonal handle faces;

(b) Alternative layout of ribs in the push faces;

(c) Grooves instead of ribs in the push faces;

(d) Coarse texture on the push faces instead of ribs;

(e) Ribs, grooves or coarse texture on the pull faces;

(f) Alternative polygonal handle materials;

(g) Elastically deformable, tactile-responsive, polygonal handle material;

(h) Alternative pin materials;

(i) Alternative pin deformation types in the embedded area of the pin such as drill outs, embossing, hooking etc, in an industrially efficient manner which, when the polygonal handle is formed around the embedment, causes the polygonal handle and pin to engage inseparably;

(j) The depth of the embedment could be increased.

CONCLUSION

In view of the description above, the present invention, the force advantageous Butterfly Push-Pull Pin, represents a major departure from the work exhibited in prior art. It offers improved ease, efficiency and stability of means, in driving the push pin into supporting material and in pulling it out of supporting material. In addition, the end of the pin embedded in the polygonal handle is deformed and when the polygonal handle is cast, formed or glued around the deformed embedment, the handle and pin are made into one unit. When the Butterfly Push-Pull Pin is extracted from supporting material, the embedded end of the driven pin will remain in the polygonal handle and it will not remain in the supporting material, as sometimes happen with prior art.

I claim:

1. A push-pull pin for securing items to a supporting material comprising:

a handle;

a pin having a deformed end embedded into the handle and a pointed end for piercing items to be supported to the supporting material;

the handle consisting of six surfaces forming a three-dimensional polygon including four major surfaces and two minor surfaces, one of the minor surfaces is at the bottom of the handle and includes the pin protruding therefrom, the other minor surface is at the top of the handle and is parallel to the bottom minor surface, two of the major surfaces are diametrically opposed to one another and are symmetrically inclined away from one another from the top minor surface to the bottom minor surface to facilitate grasping and pushing forces for piercing the items and pushing the pin into the supporting material, the other two of the major surfaces are diametrically opposed to one another and are symmetrically inclined away from one another from the bottom minor surface to the top minor surface to facilitate grasping and pulling forces for pulling the pin from the support material and items.

2. A push-pull pin according to claim 1, wherein an axis of said pin is at the center of the bottom minor surface and aligns with a centroid of the handle for directing user applied forces along the axis.

* * * * *